United States Patent
Bamford et al.

(10) Patent No.: US 7,277,897 B2
(45) Date of Patent: *Oct. 2, 2007

(54) DYNAMIC REASSIGNMENT OF DATA OWNERSHIP

(75) Inventors: Roger J. Bamford, Peterborough, NH (US); Sashikanth Chandrasekaran, Chennai (IN); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 535 days.

This patent is subject to a terminal disclaimer.

(21) Appl. No.: 10/831,401

(22) Filed: Apr. 23, 2004

(65) Prior Publication Data

US 2004/0215639 A1    Oct. 28, 2004

Related U.S. Application Data

(63) Continuation-in-part of application No. 10/718,875, filed on Nov. 21, 2003, now Pat. No. 6,845,384, and a continuation-in-part of application No. 10/665,062, filed on Sep. 17, 2003, now Pat. No. 7,139,772.

(60) Provisional application No. 60/492,019, filed on Aug. 1, 2003.

(51) Int. Cl.
 *G06F 17/30* (2006.01)
(52) U.S. Cl. .................. 707/103 X; 707/10
(58) Field of Classification Search .......... 707/1–10, 707/100–104.1, 200–206
See application file for complete search history.

(56) References Cited

U.S. PATENT DOCUMENTS

| 4,827,411 A | 5/1989 | Arrowood et al. |
| 4,873,517 A | 10/1989 | Baratz et al. |
| 4,914,571 A | 4/1990 | Baratz et al. |
| 4,972,437 A | 11/1990 | Citron et al. |
| 5,101,348 A | 3/1992 | Arrowood et al. |
| 5,109,483 A | 4/1992 | Baratz et al. |

(Continued)

FOREIGN PATENT DOCUMENTS

CA     2 435 388 A1    1/2003

(Continued)

OTHER PUBLICATIONS

Michael J. Feeley et al., Integrating Coherency and Recoverability in Distributed Systems, (no date), www.usenix.org/publications, pp. 1-14.*

(Continued)

*Primary Examiner*—Diane Mizrahi
(74) *Attorney, Agent, or Firm*—Hickman Palermo Truong & Becker LLP

(57) ABSTRACT

Various techniques are described for improving the performance of a shared-nothing database system in which at least two of the nodes that are running the shared-nothing database system have shared access to a disk. Specifically, techniques are provided for changing the ownership of data in a shared-nothing database dynamically, based on factors such as which node would be the most efficient owner relative to the performance of a particular operation. Once determined, the ownership of the data may be changed permanently to the new owner, or temporarily for the duration of the particular operation.

32 Claims, 2 Drawing Sheets

U.S. PATENT DOCUMENTS

| | | | |
|---|---|---|---|
| 5,313,051 A | 5/1994 | Brigida et al. | |
| 5,319,773 A | 6/1994 | Britton et al. | |
| 5,432,926 A | 7/1995 | Citron et al. | |
| 5,539,883 A | 7/1996 | Allon et al. | |
| 5,555,404 A | 9/1996 | Torbjørnsen et al. | |
| 5,613,060 A | 3/1997 | Britton et al. | |
| 5,675,791 A | 10/1997 | Bhide et al. | |
| 5,740,362 A | 4/1998 | Buickel et al. | |
| 5,832,484 A | 11/1998 | Sankaran et al. | |
| 5,845,326 A | 12/1998 | Hirayama et al. | 711/135 |
| 5,892,754 A | 4/1999 | Kompella et al. | |
| 5,907,849 A | 5/1999 | Dias et al. | |
| 6,011,918 A | 1/2000 | Cohen et al. | |
| 6,088,758 A | 7/2000 | Kaufman et al. | 711/100 |
| 6,119,244 A | 9/2000 | Schoenthal et al. | |
| 6,253,229 B1 | 6/2001 | Nielsen et al. | |
| 6,311,265 B1 | 10/2001 | Beckerle et al. | |
| 6,321,238 B1 | 11/2001 | Putzolu | |
| 6,341,340 B1 | 1/2002 | Tsukerman et al. | |
| 6,370,619 B1 | 4/2002 | Ho et al. | |
| 6,438,714 B1 | 8/2002 | Canestaro et al. | |
| 6,453,404 B1 | 9/2002 | Bereznyi et al. | 711/171 |
| 6,480,895 B1 | 11/2002 | Gray et al. | |
| 6,567,509 B1 | 5/2003 | Gusler et al. | |
| 6,567,811 B1 | 5/2003 | Edwards et al. | |
| 6,611,899 B2 | 8/2003 | Takahashi et al. | 711/119 |
| 6,636,248 B1 | 10/2003 | Christensen et al. | |
| 6,711,571 B2 | 3/2004 | Putzolu | |
| 6,728,897 B1 | 4/2004 | Cramer et al. | |
| 6,873,987 B1 | 3/2005 | Novaes et al. | |
| 6,928,580 B2 | 8/2005 | Pedone et al. | |
| 6,978,279 B1 | 12/2005 | Lomet et al. | 707/202 |
| 6,981,104 B2 | 12/2005 | Prabhu | 711/144 |
| 7,039,828 B1 | 5/2006 | Scott | |
| 2003/0041215 A1 | 2/2003 | George et al. | 711/141 |
| 2004/0172422 A1* | 9/2004 | Putzolu | 707/200 |
| 2004/0215640 A1 | 10/2004 | Bamford et al. | |
| 2006/0143350 A1* | 6/2006 | Miloushev et al. | 710/242 |

FOREIGN PATENT DOCUMENTS

| | | |
|---|---|---|
| EP | 0483424 A1 | 10/1990 |
| EP | 0642092 A2 | 8/1994 |
| EP | 1521184 A2 | 6/2001 |
| WO | WO97/04384 A | 2/1997 |
| WO | WO99/44130 A | 9/1999 |
| WO | WO 02/073416 A | 9/2002 |
| WO | WO 2005/013155 A1 | 2/2005 |

OTHER PUBLICATIONS

BMC, Mainview for Network Management-Tame Your Wild TCP/IP Network, Apr. 25, 2004,www.documents.bmc.com/products, pp. 1-6.*

Goya, P, et al., Evaluation of Object Placement Techniques in a Polcy-Managed Storage System, (no date), www.lass.cs.umass.edu/papers, pp. 1-21.*

International Preliminary Examining Authority, "Notification of Transmittal of the International Preliminary Report of Patentability," PCT/US2004/024425, dated Feb. 6, 2006, 6 pages.

Current Claims, PCT/US2004/024425, 4 pages.

International Searching Authority, "Notification of Transmittal of the International Search Report and the Written Opinion of the International Searching Authority, or the Declaration," PCT/US2004/024554, mailing date Aug. 3, 2005, 13 pages.

Current Claims, PCT/US2004/024554, 14 pages.

International Searching Authority, "Written Opinion of the International Searching Authority," PCT/US2004/02555, mailing date Aug. 3, 2005, 11 pages.

Current Claims, PCT/US2004/02555, 7 pages.

Abdallah, Maha et al., "One-Phase Commit: Does It Make Sense?" IEEE (1998), pp. 182-192.

Chandrasekaran, Sashikanth et al., "Shared Cache—The Future of Parallel Databases" IEEE (2003), pp. 840-850.

Lee, Inseon, et al., "A Single Phase Distributed Commit Protocol for Main Memory Database Systems" IEEE (2002), 8 pages.

Samaras, George et al., "Two-Phase Commit Optimization and Tradeoffs in the Commercial Environment" IEEE (1993), pp. 520-529.

International Search Report for PCT/US2004/024451, 11 pages.

* cited by examiner

DYNAMIC REASSIGNMENT OF DATA OWNERSHIP

PRIORITY CLAIM/RELATED APPLICATIONS

This application claims the benefit of priority from U.S. Provisional Application Ser. No. 60/492,019 entitled "Shared Nothing on Shared Disk Hardware", filed Aug. 1, 2003, which is incorporated by reference in its entirety for all purposes as if fully set forth herein.

This application also claims benefit as a Continuation-in-part of application Ser. No. 10/665,062 filed Sep. 17, 2003 now U.S. Pat. No. 7,139,772 and application Ser. No. 10/718,875, filed Nov. 21, 2003, now U.S. Pat. No. 6,845,384 the entire contents of which are hereby incorporated by reference as if fully set forth herein.

This application is related to U.S. application Ser. No. 10/831,413, entitled "Parallel Recovery by Non-Failed Nodes," by Roger Bamford, Sashikanth Chandrasekaran and Angelo Pruscino, filed on the same day herewith;, and U.S. application Ser. No. 10/831,248, entitled "Partitioned Shared Cache," by Roger Bamford, Sashikanth Chandrasekaran and Angelo Pruscino, filed on the same day herewith; both of which are incorporated by reference in their entirety for all purposes as if fully set forth herein.

FIELD OF THE INVENTION

The present invention relates to techniques for managing data in a shared-nothing database system running on shared disk hardware.

BACKGROUND OF THE INVENTION

Multi-processing computer systems typically fall into three categories: shared everything systems, shared disk systems, and shared-nothing systems. In shared everything systems, processes on all processors have direct access to all volatile memory devices (hereinafter generally referred to as "memory") and to all non-volatile memory devices (hereinafter generally referred to as "disks") in the system. Consequently, a high degree of wiring between the various computer components is required to provide shared everything functionality. In addition, there are scalability limits to shared everything architectures.

In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node. Shared disk systems generally require less wiring than shared everything systems. Shared disk systems also adapt easily to unbalanced workload conditions because all nodes can access all data. However, shared disk systems are susceptible to coherence overhead. For example, if a first node has modified data and a second node wants to read or modify the same data, then various steps may have to be taken to ensure that the correct version of the data is provided to the second node.

In shared-nothing systems, all processors, memories and disks are grouped into nodes. In shared-nothing systems as in shared disk systems, each node may itself constitute a shared everything system or a shared disk system. Only the processes running on a particular node can directly access the memories and disks within the particular node. Of the three general types of multi-processing systems, shared-nothing systems typically require the least amount of wiring between the various system components. However, shared-nothing systems are the most susceptible to unbalanced workload conditions. For example, all of the data to be accessed during a particular task may reside on the disks of a particular node. Consequently, only processes running within that node can be used to perform the work granule, even though processes on other nodes remain idle.

Databases that run on multi-node systems typically fall into two categories: shared disk databases and shared-nothing databases.

Shared Disk Databases

A shared disk database coordinates work based on the assumption that all data managed by the database system is visible to all processing nodes that are available to the database system. Consequently, in a shared disk database, the server may assign any work to a process on any node, regardless of the location of the disk that contains the data that will be accessed during the work.

Because all nodes have access to the same data, and each node has its own private cache, numerous versions of the same data item may reside in the caches of any number of the many nodes. Unfortunately, this means that when one node requires a particular version of a particular data item, the node must coordinate with the other nodes to have the particular version of the data item shipped to the requesting node. Thus, shared disk databases are said to operate on the concept of "data shipping," where data must be shipped to the node that has been assigned to work on the data.

Such data shipping requests may result in "pings". Specifically, a ping occurs when a copy of a data item that is needed by one node resides in the cache of another node. A ping may require the data item to be written to disk, and then read from disk. Performance of the disk operations necessitated by pings can significantly reduce the performance of the database system.

Shared disk databases may be run on both shared-nothing and shared disk computer systems. To run a shared disk database on a shared-nothing computer system, software support may be added to the operating system or additional hardware may be provided to allow processes to have access to remote disks.

Shared-Nothing Databases

A shared-nothing database assumes that a process can only access data if the data is contained on a disk that belongs to the same node as the process. Consequently, if a particular node wants an operation to be performed on a data item that is owned by another node, the particular node must send a request to the other node for the other node to perform the operation. Thus, instead of shipping the data between nodes, shared-nothing databases are said to perform "function shipping".

Because any given piece of data is owned by only one node, only the one node (the "owner" of the data) will ever have a copy of the data in its cache. Consequently, there is no need for the type of cache coherency mechanism that is required in shared disk database systems. Further, shared-nothing systems do not suffer the performance penalties associated with pings, since a node that owns a data item will not be asked to save a cached version of the data item to disk so that another node could then load the data item into its cache.

Shared-nothing databases may be run on both shared disk and shared-nothing multi-processing systems. To run a shared-nothing database on a shared disk machine, a mechanism may be provided for partitioning the database, and assigning ownership of each partition to a particular node.

The fact that only the owning node may operate on a piece of data means that the workload in a shared-nothing database may become severely unbalanced. For example, in a system of ten nodes, 90% of all work requests may involve data that is owned by one of the nodes. Consequently, the one node is overworked and the computational resources of the other nodes are underutilized. To "rebalance" the workload, a shared-nothing database may be taken offline, and the data (and ownership thereof) may be redistributed among the nodes. However, this process involves moving potentially huge amounts of data, and may only temporarily solve the workload skew.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Various techniques are described hereafter for improving the performance of a shared-nothing database system that includes a shared disk storage system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are described hereafter for improving the performance of a shared-nothing database system in which at least two of the nodes that are running the shared-nothing database system have shared access to a disk. As dictated by the shared-nothing architecture of the database system, each piece of data is still owned by only one node at any given time. However, the fact that at least some of the nodes that are running the shared-nothing database system have shared access to a disk is exploited to more efficiently rebalance and recover the shared-nothing database system.

Specifically, techniques are provided for changing the ownership of data in a shared-nothing database dynamically, based on factors such as which node would be the most efficient owner relative to the performance of a particular operation. Once determined, the ownership of the data may be changed permanently to the new owner, or temporarily for the duration of the particular operation.

To avoid the overhead associated with conventional ownership reassignment operations, the ownership reassignment may be performed using the techniques described in 50277-2277, which do not require the data that is being reassigned to be moved from where the data resides on persistent storage.

Exemplary Cluster that Includes Shared Disk Systems

Figure 1:
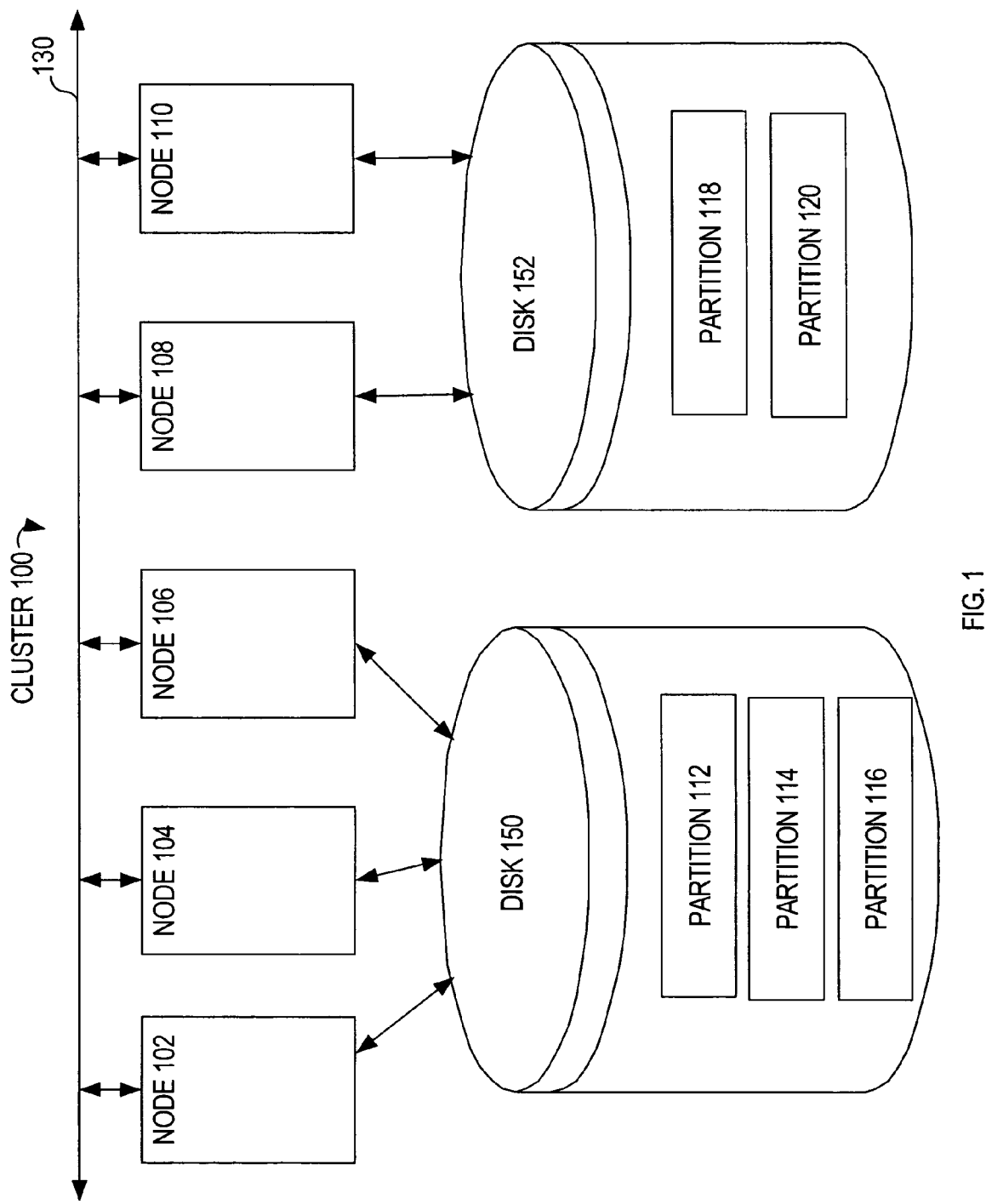
FIG. 1 is a block diagram illustrating a cluster that includes two shared disk subsystems, according to an embodiment of the invention.

FIG. 1 is a block diagram illustrating a cluster 100 upon which embodiments of the invention may be implemented. Cluster 100 includes five nodes 102, 104, 106, 108 and 110 that are coupled by an interconnect 130 that allows the nodes to communicate with each other. Cluster 100 includes two disks 150 and 152. Nodes 102, 104 and 106 have access to disk 150, and nodes 108 and 110 have access to disk 152. Thus, the subsystem that includes nodes 102, 104 and 106 and disk 150 constitutes a first shared disk system, while the subsystem that includes nodes 108 and 110 and disk 152 constitutes a second shared disk system.

Cluster 100 is an example of a relatively simple system that includes two shared disk subsystems with no overlapping membership between the shared disk subsystems. Actual systems may be much more complex than cluster 100, with hundreds of nodes, hundreds of shared disks, and many-to-many relationships between the nodes and shared disks. In such a system, a single node that has access to many disks may, for example, be a member of several distinct shared disk subsystems, where each shared disk subsystem includes one of the shared disks and all nodes that have access to the shared disk.

Shared-Nothing Database on Shared Disk System

For the purpose of illustration, it shall be assumed that a shared-nothing database system is running on cluster 110, where the database managed by the shared-nothing database system is stored on disks 150 and 152. Based on the shared-nothing nature of the database system, the data may be segregated into five groups or partitions 112, 114, 116, 118 and 120. Each of the partitions is assigned to a corresponding node. The node assigned to a partition is considered to be the exclusive owner of all data that resides in that partition. In the present example, nodes 102, 104, 106, 108 and 110 respectively own partitions 112, 114, 116, 118 and 120. The partitions 112, 114 and 118 owned by the nodes that have access to disk 150 (nodes 102, 104 and 106) are stored on disk 150. Similarly, the partitions 118 and 120 owned by the nodes that have access to disk 152 (nodes 108 and 110) are stored on disk 152.

As dictated by the shared-nothing nature of the database system running on cluster 100, any piece of data is owned by at most one node at any given time. In addition, access to the shared data is coordinated by function shipping. For example, in the context of a database system that supports the SQL language, a node that does not own a particular piece of data may cause an operation to be performed on that data by forwarding fragments of SQL statements to the node that does own the piece of data.

Ownership Map

To efficiently perform function shipping, all nodes need to know which nodes own which data. Accordingly, an ownership map is established, where the ownership map indicates the data-to-node ownership assignments. During runtime, the various nodes consult the ownership map to route SQL fragments to the correct nodes at run-time.

According to one embodiment, the data-to-node mapping need not be determined at compilation time of an SQL (or any other database access language) statement. Rather, as shall be described in greater detail hereafter, the data-to-node mapping may be established and revised during runtime. Using the techniques described hereafter, when the ownership changes from one node that has access to the disk on which the data resides to another node that has access to the disk on which the data resides, the ownership change is performed without moving the data from its persistent location on the disk.

Locking

Locks are structures used to coordinate access to a resource among several entities that have access to the resource. In the case of a shared-nothing database system, there is no need for global locking to coordinate accesses to the user data in the shared-nothing database, since any given piece of data is only owned by a single node. However, since all of the nodes of the shared-nothing database require access to the ownership map, some locking may be required to prevent inconsistent updates to the ownership map.

According to one embodiment, a two-node locking scheme is used when ownership of a piece of data is being reassigned from one node (the "old owner") to another node (the "new owner"). Further, a global locking mechanism may be used to control access to the metadata associated with the shared-nothing database. Such metadata may include, for example, the ownership map.

Bucket-Based Partitioning

As mentioned above, the data that is managed by the shared-nothing database is partitioned, and the data in each partition is exclusively owned by one node. According to one embodiment, the partitions are established by assigning the data to logical buckets, and then assigning each of the buckets to a partition. Thus, the data-to-node mapping in the ownership map includes a data-to-bucket mapping, and a bucket-to-node mapping.

According to one embodiment, the data-to-bucket mapping is established by applying a hash function to the name of each data item. Similarly, the bucket-to-node mapping may be established by applying another hash function to identifiers associated with the buckets. Alternatively, one or both of the mappings may be established using range-based partitioning, list partitioning, or by simply enumerating each individual relationship. For example, one million data items may be mapped to fifty buckets by splitting the namespace of the data items into fifty ranges. The fifty buckets may then be mapped to five nodes by storing a record for each bucket that (1) identifies the bucket and (2) identifies the node currently assigned the bucket.

The use of buckets significantly reduces the size of the ownership mapping relative to a mapping in which a separate mapping record was stored for each data item. Further, in embodiments where there number of buckets exceeds the number of nodes, the use of buckets makes it relatively easy to reassign ownership to a subset of the data owned by a given node. For example, a new node may be assigned a single bucket from a node that is currently assigned ten buckets. Such a reassignment would simply involve revising the record that indicates the bucket-to-node mapping for that bucket. The data-to-bucket mapping of the reassigned data would not have to be changed.

As mentioned above, the data-to-bucket mapping may be established using any one of a variety of techniques, including but not limited to hash partitioning, range partitioning or list values. If range based partitioning is used and the number of ranges is not significantly greater than the number of nodes, then the database server may employ finer grained (narrower) ranges to achieve the desired number of buckets so long as the range key used to partition the data items is a value that will not change (e.g. date). If the range key is a value that could change, then in response to a change to the range key value for a particular data item, the data item is removed from its old bucket and added to the bucket that corresponds to the new value of the data item's range key.

Establishing the Initial Assignment of Ownership

Using the mapping techniques described above, ownership of a single table or index can be shared among multiple nodes. Initially, the assignment of ownership may be random. For example, a user may select the key and partitioning technique (e.g. hash, range, list, etc) for the data-to-bucket mapping, and the partitioning technique for the bucket-to-node mapping, but need not specify the initial assignment of buckets to nodes. The database server may then determine the key for the bucket-to-node mapping based on the key for the data-to-bucket mapping, and create the initial bucket-to-node assignments without regard to the specific data and database objects represented by the buckets.

For example, if the user chooses to partition the object based on key A, the database server will use key A to determine the bucket-to-node mapping. In some cases, the database server can append extra keys or apply a different function (as long as it preserves the data-to-bucket mapping) to the key(s) used for the data-to-bucket mapping. For example, if the object is hash partitioned using key A into four data buckets, the database server could subdivide each of those four buckets into three buckets each (to allow for flexible assignment of buckets to node) by either applying a hash function on key B to determine the bucket-to-node mapping, or by simply increasing the number of hash values to 12. If the hash is a modulo function the 0th, 4th and 8th bucket-to-node buckets will correspond to the 0th data-to-bucket bucket, the 1st, 5th and 9th bucket-to-node buckets will correspond to the 1st data-to-bucket bucket etc.

As another example, if the object is range partitioned on a key A which is of type DATE, then the data-to-bucket mapping could be specified by using the function year(date) which returns the year. But the bucket-to-node mapping could be internally computed by the database server by using the month_and_year(date). Each year partition is divided into 12 bucket-to-node buckets. This, way, if the database server determines that a particular year's data is accessed frequently (which will typically be the current year) it can redistribute those 12 buckets among the other nodes.

In both examples given above, given a bucket-to-node bucket#, the database server can uniquely determine the data-to-bucket bucket#. Also in those examples, the user selects the key and partitioning technique for the data-to-bucket mapping. However, in alternative embodiments, the user may not select the key and partitioning technique for the data-to-bucket mapping. Rather, the key and partitioning technique for the data-to-bucket mapping may also be determined automatically by the database server.

According to one embodiment, the database server makes the initial bucket-to-node assignments based on how many buckets should be assigned to each node. For example, nodes with greater capacity may be assigned more buckets. However, in the initial assignments, the decision of which particular buckets should be assigned to which nodes is random.

In an alternative embodiment, the database server does take into account which data is represented by a bucket when making the bucket-to-node assignments. For example, assume that data for a particular table is divided among several buckets. The database server may intentionally assign all of those buckets to the same node, or intentionally distribute ownership of those buckets among many nodes. Similarly, the database server may, in the initial assignment, attempt to assign buckets associated with tables to the same nodes as buckets associated with indexes for those tables. Conversely, the database server may attempt to assign buckets associated with tables to different nodes than the nodes to which buckets associated with indexes for those tables are assigned.

Automatic Workload-Based Reassignment of Ownership

Regardless of how the initial assignment is made, it is virtually impossible to ensure that the initial assignment will result in the optimal performance of all operations that the database server will be asked to perform. Therefore, according to one embodiment of the invention, ownership is automatically reassigned based on statistics gathered by monitoring the actual runtime operation of the database system.

For example, in one embodiment, the shared nothing database system includes a monitoring mechanism that monitors the requests made by nodes and maintains, for each bucket, statistics about how frequently non-owner nodes request operations that involve data from the bucket. According to one embodiment, the ownership map is maintained on persistent storage, but the statistics maintained by the monitoring mechanism are maintained in volatile memory.

Based on the statistics, the database server may determine that a particular non-owner node requests operations that involve data from a particular bucket at a much greater frequency than any other node. Based on this information, the database server may automatically reassign ownership of the bucket to that particular node.

The frequency at which a non-owner node requests operations that involve a bucket is just one example of the many performance factors that may be involved in an ownership reassignment decision. For example, the monitoring mechanism may also track how frequently the owner node performs, on its own behalf, operations on data from a particular bucket ("self-serving operations"). If the owner node of a particular bucket is performing self-serving operations on data from the particular bucket more frequently than any non-owning node is requesting operations on the particular bucket, then the database server may choose to not reassign ownership of the bucket. Even if a non-owner node is requesting operations on the particular bucket more frequently than the owner node is performing self-serving operations on the bucket, the database server may be configured to transfer ownership only when the usage difference exceeds a certain threshold.

According to one embodiment, if the monitoring mechanism detects that a particular resource, such as a table, is accessed by several nodes with approximately the same frequency, then the database server may evenly spread ownership of the buckets associated with the table among those nodes. Consequently, if the table is heavily accessed, the work of accessing the table will be spread more evenly among the available nodes.

Over time, as bucket ownership is adjusted based on which nodes are most frequently accessing the data in the buckets, buckets that represent logically related data will tend to be owned by the same node. For example, a bucket that corresponds to data from a particular table will tend to be owned by the same node as a bucket that corresponds to indexes that are built on that table.

By reassigning ownership based on statistics about actual bucket usage, the need to perform other more complex assignment determinations is avoided. For example, ownership need not be based on query profile, which takes into account SQL WHERE clause, JOIN conditions or AGGREGATIONs. Similarly, the user need not explicitly specify the affinity of transactions to data. Further, when the data resides on a disk that is shared by both the assignor node and the assignee node, the shared-nothing database server can quickly adapt to skew or changes in workload with no physical data redistribution. Due to the lowered cost of reassignment that results from the data residing on a shared disk, the shared nothing database server can efficiently make changes in data ownership, and measure performance, without use of any external tool.

Balancing Reassignments

If a particular node continues to own all of its initial buckets, and is dynamically assigned several new buckets because the particular node is frequently accessing the data in those buckets, then it is possible for the node to become overworked, thereby causing the workload of the database system to become skewed. Similarly, the workload will become skewed if many of the initial buckets of a particular node are reassigned to other nodes, without any buckets being reassigned to that particular node.

Therefore, when ownership of bucket is assigned to a particular node, it may be desirable to reassign ownership of a different bucket from that node to another node. Similarly, when ownership of a bucket is assigned from a particular node, it may be desirable to reassign ownership of a different bucket to that particular node. Such reassignments, made to counter the skewing effect of other reassignments, are referred to herein as "balancing reassignments".

Because reassignment operations involve some overhead, it may be desirable to perform balancing reassignments only after a certain skew threshold is satisfied. For example, the database server may maintain a "target bucket number" for each of the nodes. If the number of buckets owned by a particular node falls below the target bucket number of the particular node by a predetermined amount, then a balancing reassignment may be performed to assign one or more buckets from other nodes to that particular node. The nodes from which buckets are reassigned may be selected, for example, based on how much the number of buckets they own exceeds their respective target bucket number.

Similarly, if the number of buckets owned by a particular node exceeds the target bucket number of the particular node by a predetermined amount, then a balancing reassignment may be performed to assign one or more buckets to other nodes from that particular node. The nodes to which buckets are reassigned may be selected, for example, based on how much the number of buckets they own falls below their respective target bucket numbers.

A variety of factors may be used by the database server in determining which buckets to reassigned may during a balancing reassignment. For example, the database server may select the buckets of the assignor node that are least frequency involved in the self-serving operations of the assignor node. Alternatively, the database server may select the buckets of the assignor node that are most frequently involved in operations requested by the assignee node.

According to one embodiment, the database server takes into account many factors, including the frequency at which the buckets are involved in self-serving operations of the assignor node and the frequency at which the buckets are involved in operations requested by the assignee node.

Temporary Ownership Assignments

In the previous sections, techniques are described for reassigning ownership based on factors such as which nodes are requesting operations on which buckets of data, during monitored periods of time. However, while assignments made in this manner may be optimal in the long run, the assignments may not be optimal for any given operation. Therefore, according to one embodiment, the database server includes logic for temporarily changing the ownership assignment of buckets for the duration of a set of one or more operations. After the set of operations are completed, the buckets are reassigned back to their previous owners.

For example, the database server can change ownership of data only for the duration of a large operation. Thus, all of the buckets that correspond to a table can be owned by a single node during the day. Consequently, during the day, all requests for the table get routed to the node. The same table can be "repartitioned" for an end-of-day report to parallelize the query that retrieves the data for the end-of-day report.

As another example, the database server can change ownership of data for the duration of a recovery operation. Specifically, the database server can temporarily uniformly reassign buckets to all nodes, and each node can do forward redo-recovery and backward transaction rollback, in those buckets that each node owns, in parallel relative to the other nodes. Such ownership redistribution may be used both for database recovery and media recovery operations. For example, during a media recovery operation, after the most recent backup has been restored, each node can apply the redo from the archives in parallel. Under these circumstances, each node participating in the parallel media recovery would need to be able to read the appropriate redo logs and archives.

Flexible Placement of Parallel Query Slaves on Nodes that do not Currently Own the Data As mentioned above, ownership of data may be temporarily changed for the duration of an operation. Such temporary assignment can be used, for example, to improve the performance of queries that specify operations that can be parallelized. When an operation is parallelized, the operation is broken up into several subtasks that can be executed in parallel with each other. The processes used to execute such subtasks are referred to as parallel query slaves.

When a shared-nothing database system is implemented in a shared-disk environment, placement of parallel query slaves are not dictated by physical location of data. For example, assume that the data in table T (1) resides on a disk shared by two nodes 1 and 2, and (2) belongs to two buckets B1 and B2 that correspond to partitions of table T. A query that requires a scan of table T can be divided into two subtasks: a scan of the data in bucket B1 and a scan of the data in bucket B2. Assume that, at the time the database server is requested to execute the query, node 1 is the owner of both buckets B1 and B2. Under these circumstances, ownership of B2 can be temporarily reassigned to node 2 so that a slave on node 2 can perform the scan of B2 while a slave on node 1 performs a scan of B1.

In the above example, ownership of one bucket was temporarily assigned to another node for the purpose of involving more nodes in the processing of a parallelizable query. Conversely, it may be desirable to temporarily reassign ownership in a manner that reduces the number of nodes involved in processing a query. For example, assume that a query requires the data to be scanned by a first set of slaves, and then redistributed to a second set of slaves so that the second set of slaves can perform some subsequent operation on the data. If the scanning is performed by slaves that are spread across many nodes, then the redistribution that is required by the query will result in a large amount of inter-node communication. To reduce the amount of inter-node communication, the ownership of the partitions of table T can be consolidated.

For example, if B1 is owned by node 1 and B2 is owned by node 2 at the time the query is initiated, then for the duration of the query the ownership of table T can be consolidated by temporarily assigning B2 from node 2 to node 1. Under these circumstances, both the first and second set of slaves would be on node 1. Therefore, the redistribution that takes place after the scan will not result in inter-node communication.

Working Without Ownership

As mentioned above, in shared-nothing database systems, only the owner of a piece of data is allowed to perform a task that involves the data. However, according to one aspect of the invention, whether a non-owner of a piece of data is allowed to operate on the data hinges on the isolation level required by the operation.

The concept of isolation levels is discussed in detail, for example, in U.S. Pat. No. 5,870,758, entitled "Method And Apparatus For Providing Isolation Levels In A Database System". In the context of database systems, several isolation levels have been defined. The defined isolation levels include a "read uncommitted" isolation level and a "read committed" isolation level. The read uncommitted isolation level, which does not protect against dirty reads, non-repeatable reads, and phantom reads, is sufficient for certain operations, such as data mining and statistical queries. For such operations, large query fragments that operate on pieces of data can run on nodes that do not own those pieces of data.

Unlike the read uncommitted isolation level, the read committed isolation level prevents against dirty reads. For operations that require read committed isolation level, the node that owns a set of data items can, prior to execution of an operation that involves the data items, flush to disk the committed pages that contain the data items. After the pages have been flushed to disk, a node that does not own the data items can perform the operation that involves the data items. Because the committed pages were flushed to disk they can be seen by the non-owner node that has shared access to the disk. Consequently, the read committed isolation level is maintained. During the performance of the operations, the owner can mark the data items as read-only until the operations are completed.

Using the Shared Disk for Coordinator-Slave Communication

When a query is parallelized, one node often serves the role of coordinating the various slaves that participate in executing the query. That node, often referred to as the "coordinator", often receives the temporary results produced by the participating slaves. The amount of the data that the coordinator receives from the query slaves may be significant. Therefore, according to aspect of the invention, the temporary results that are to be communicated from a query slave to coordinator are communicated through the shared disk if the amount of data to be communicated will overwhelm the interconnect between the nodes. Specifically, if the amount of temporary results produced by a slave exceeds a certain threshold, the results are written to a disk that is shared between the slave and the coordinator, rather than being sent directly from the volatile memory of the node on which the slave resides to the volatile memory of the node on which the coordinator resides. Using the shared disk as an intermediary in this manner is especially useful for blocking operators where the consumer of an operator needs to wait until the child operator completes (i.e. there is no pipelining between operators).

Hardware Overview

Figure 2:
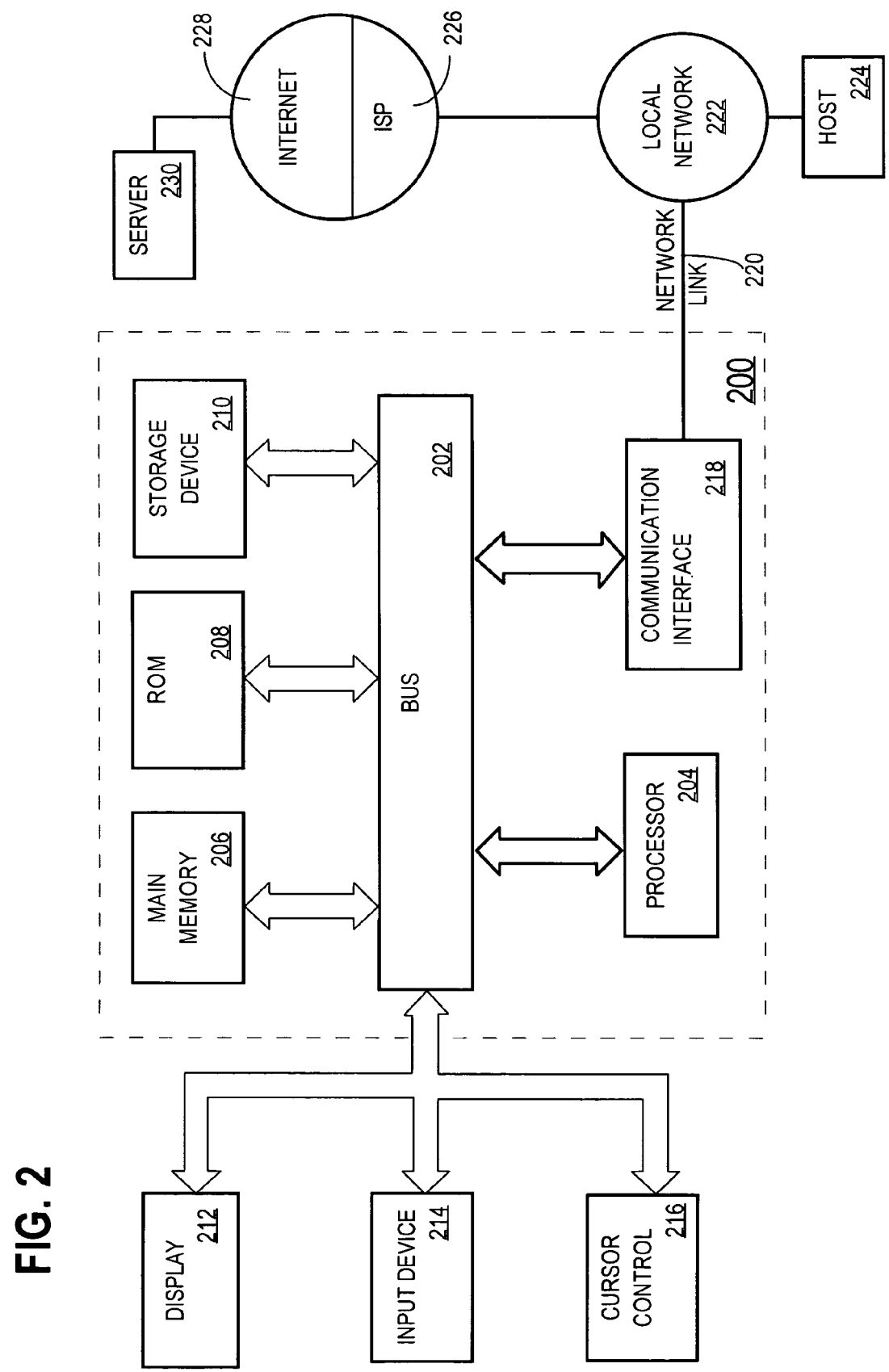
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing data, the method comprising the steps of:
   maintaining a plurality of persistent data items on persistent storage accessible to a plurality of nodes, the persistent data items including a particular data item stored at a particular location on said persistent storage;
   assigning exclusive ownership of each of the persistent data items to one of the nodes, wherein a particular node of said plurality of nodes is assigned exclusive ownership of said particular data item;
   wherein to perform, for any given node, an operation that involves said particular data item, the given node ships the operation to the particular node for the particular node to perform the operation on the particular data item as said particular data item is exclusively owned by said particular node;
   gathering statistics by gathering information about at least one of system performance and workload; and
   dynamically reassigning ownership of the persistent data items based on said statistics to improve at least one of system performance and throughput.

2. The method of claim 1 wherein the step of gathering information includes monitoring which nodes require operations that involve the persistent data items.

3. The method of claim 1 wherein the plurality of nodes are nodes of a multi-node database system.

4. The method of claim 1 wherein the step of dynamically reassigning is performed without receiving user input that specifies the nodes to which the persistent data items are to be reassigned.

5. The method of claim 3 wherein the step of dynamically reassigning is performed while said multi-node database system continues to process database commands from database applications.

6. The method of claim 1 wherein the step of dynamically reassigning is performed after a certain period of time, and is based on which nodes required operations that involve the persistent data items during said certain period of time.

7. The method of claim 6 wherein the step of dynamically reassigning includes reassigning ownership of the particular data item to the node that most frequently required operations that involved the particular data item.

8. The method of claim 1 wherein:
   the step of dynamic reassigning includes reassigning ownership of the particular data item to a first node; and
   the method further comprises the step of dynamically reassigning ownership of a second data item from the first node to a second node in response to reassigning ownership of the particular data item to the first node.

9. The method of claim 8 wherein:
   the assignment of the particular data item to the first node causes a threshold associated with the first node to be exceeded; and
   the step of dynamically reassigning ownership of the second data item is performed in response to the threshold being exceeded.

10. A method for managing data, the method comprising the steps of:
    maintaining a plurality of persistent data items on persistent storage accessible to a plurality of nodes, the persistent data items including a particular data item stored at a particular location on said persistent storage;
    assigning exclusive ownership of each of the persistent data items to one of the nodes, wherein a first node of said plurality of nodes is assigned exclusive ownership of said particular data item;
    wherein to perform, for any given node, an operation that involves said particular data item, the given node ships the operation to the first node for the first node to perform the operation on the particular data item as said particular data item is exclusively owned by said first node;
    while the exclusive ownership of the particular data item is held by said first node, receiving a command that requires an operation to be performed on the particular data item; and
    causing the operation that is specified in the command, which requires the operation to be performed on the particular data item, to be performed by a second node that is different than said first node.

11. The method of claim 10 wherein the step of causing the operation to be performed by a second node includes:
    temporarily reassigning exclusive ownership of said particular data item to the second node for a duration that is at least as long as required for said second node to perform a sub-operation of said command, wherein said sub-operation involves said particular data item; and
    after said duration, automatically reassigning said exclusive ownership of said particular data item back to said first node.

12. The method of claim 11 wherein the step of temporarily reassigning is performed to allow sub-operations of a parallelized operation to be distributed among slaves that reside on a plurality of nodes.

13. The method of claim 11 wherein the step of temporarily reassigning is performed to allow operations required by said command to be consolidated at a set of one or more nodes that includes said second node and does not include said first node.

14. The method of claim 10 wherein:
    the step of causing the operation to be performed by a second node includes causing the second node to perform the operation without the second node obtaining exclusive ownership of said particular data item;

the second node is allowed to access said particular data item to perform a sub-operation of said command, wherein said sub-operation involves said particular data item; and after the second node has completed performance of said sub-operation, ceasing to allow said second node to access said particular data item.

15. The method of claim 14 further comprising the steps of:

determining that read uncommitted isolation level applies to said command; and allowing said second node to perform said sub-operation without requiring said first node to flush to disk any dirty version of said particular data item.

16. The method of claim 14 further comprising the steps of:

determining that read committed isolation level applies to said command; and preventing said second node from performing said sub-operation until said first node has flushed to disk any dirty version of said particular data item.

17. A computer-readable storage medium carrying one or more sequences of instructions which, when executed by one or more processors, causes the one or more processors to perform the method recited in claim 1.

18. A computer-readable storage medium carrying one or more sequences of instructions which, when executed by one or more processors, causes the one or more processors to perform the method recited in claim 2.

19. A computer-readable storage medium carrying one or more sequences of instructions which, when executed by one or more processors, causes the one or more processors to perform the method recited in claim 3.

20. A computer-readable storage medium carrying one or more sequences of instructions which, when executed by one or more processors, causes the one or more processors to perform the method recited in claim 4.

21. A computer-readable storage medium carrying one or more sequences of instructions which, when executed by one or more processors, causes the one or more processors to perform the method recited in claim 5.

22. A computer-readable storage medium carrying one or more sequences of instructions which, when executed by one or more processors, causes the one or more processors to perform the method recited in claim 6.

23. A computer-readable storage medium carrying one or more sequences of instructions which, when executed by one or more processors, causes the one or more processors to perform the method recited in claim 7.

24. A computer-readable storage medium carrying one or more sequences of instructions which, when executed by one or more processors, causes the one or more processors to perform the method recited in claim 8.

25. A computer-readable storage medium carrying one or more sequences of instructions which, when executed by one or more processors, causes the one or more processors to perform the method recited in claim 9.

26. A computer-readable storage medium carrying one or more sequences of instructions which, when executed by one or more processors, causes the one or more processors to perform the method recited in claim 10.

27. A computer-readable storage medium carrying one or more sequences of instructions which, when executed by one or more processors, causes the one or more processors to perform the method recited in claim 11.

28. A computer-readable storage medium carrying one or more sequences of instructions which, when executed by one or more processors, causes the one or more processors to perform the method recited in claim 12.

29. A computer-readable storage medium carrying one or more sequences of instructions which, when executed by one or more processors, causes the one or more processors to perform the method recited in claim 13.

30. A computer-readable storage medium carrying one or more sequences of instructions which, when executed by one or more processors, causes the one or more processors to perform the method recited in claim 14.

31. A computer-readable storage medium carrying one or more sequences of instructions which, when executed by one or more processors, causes the one or more processors to perform the method recited in claim 15.

32. A computer-readable storage medium carrying one or more sequences of instructions which, when executed by one or more processors, causes the one or more processors to perform the method recited in claim 16.

* * * * *